(12) United States Patent
Barbot et al.

(10) Patent No.: US 8,989,463 B2
(45) Date of Patent: Mar. 24, 2015

(54) LOCALIZATION AND TRACKING OF CRYO-BALLOON DURING INTERVENTIONAL FLUOROSCOPY IMAGING

(75) Inventors: Julien Christian Barbot, Princeton, NJ (US); Atilla Peter Kiraly, Plainsboro, NJ (US); Norbert Strobel, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 127 days.

(21) Appl. No.: 13/551,902

(22) Filed: Jul. 18, 2012

(65) Prior Publication Data

US 2013/0083980 A1  Apr. 4, 2013

Related U.S. Application Data

(60) Provisional application No. 61/514,199, filed on Aug. 2, 2011.

(51) Int. Cl.
  *G06K 9/00* (2006.01)
  *G06T 7/00* (2006.01)
(52) U.S. Cl.
  CPC ............ *G06T 7/0085* (2013.01); *G06T 7/0012* (2013.01); *G06T 7/0046* (2013.01); *G06T 2207/10121* (2013.01); *G06T 2207/20136* (2013.01); *G06T 2207/30021* (2013.01)
  USPC ........................................................ 382/128
(58) Field of Classification Search
  None
  See application file for complete search history.

(56) References Cited

U.S. PATENT DOCUMENTS

| | | | |
|---|---|---|---|
| 6,493,575 B1 * | 12/2002 | Kesten et al. | 600/431 |
| 7,792,342 B2 * | 9/2010 | Barbu et al. | 382/128 |
| 7,794,455 B2 * | 9/2010 | Abboud et al. | 606/21 |
| 2008/0107314 A1 * | 5/2008 | Georgescu et al. | 382/128 |
| 2008/0137923 A1 * | 6/2008 | Spahn | 382/128 |
| 2009/0163800 A1 * | 6/2009 | Xu et al. | 600/424 |
| 2010/0226537 A1 * | 9/2010 | Villain et al. | 382/103 |
| 2011/0228992 A1 * | 9/2011 | Wels et al. | 382/128 |
| 2012/0029495 A1 * | 2/2012 | Wittenberger | 606/21 |
| 2012/0230565 A1 * | 9/2012 | Steinberg et al. | 382/130 |

OTHER PUBLICATIONS

Alvarez et al. "Image Selective Smoothing and Edge Detection by Nonlinear Diffusion." SIAM Journal on Numerical Analysis, vol. 29, No. 3 (Jun. 1992), pp. 845-866.*
Van Belle et al. "Pulmonary vein isolation using an occluding cryoballoon for circumferential ablation: feasibility, complications, and short-term outcome." European Heart Journal (2007) 28, pp. 2231-2237.*

(Continued)

*Primary Examiner* — Vu Le
*Assistant Examiner* — Samah Beg

(57) ABSTRACT

A method for the detection of a balloon catheter within a fluoroscopic image, including: removing noise from a fluoroscopic image; detecting edges of a balloon catheter in the fluoroscopic image, wherein the detected edges include subsets of connected edges; extracting an edge subset from the subsets of connected edges; fitting a model to the extracted edge subset; removing outliers of the extracted edge subset based on the fitting of the model; adding the extracted edge subset without the outlier to a data set; repeating the extracting, fitting, removing and adding steps for the remainder of the subsets of connected edges; and fitting the model to the data set, wherein the data set is indicative of the balloon catheter.

18 Claims, 6 Drawing Sheets

(56) References Cited

OTHER PUBLICATIONS

Liang et al. "Estimation of Arterial Wall Strain Based on IVUS Image Registration." Proceedings of the 28th IEEE, EMBS Annual International Conference, Aug. 30-Sep. 3, 2006, pp. 3218-3221.*

Siklody et al. "Cryoballoon Pulmonary Vein Isolation Guided by Transesophageal Echocardiography: Novel Aspects on an Emerging Ablation Technique." Journal of Cardiovascular Electrophysiology, Nov. 2009, vol. 20 (11): pp. 1197-1202.*

Bismuth et al. Elastic Registration for Stent Enhancement in X-Ray Image Sequences, IEEE 2008, pp. 2400-2403.*

Bismuth et al. "A comprehensive study of stent visualization enhancement in X-ray images by image processing means", Medical Image Analysis 15 (2011), pp. 565-576.*

Honnorat et al. "Robust Guidewire Segmentation Through Boosting, Clustering and Linear Programming", IEEE 2010, pp. 924-927.*

Schoonenberg et al. "Adaptive spatial-temporal filtering applied to x-ray fluoroscopy angiography", Medical Imaging 2005: Visualization, Image-Guided Procedures, and Display, edited by Robert L. Galloway, Jr., Kevin R. Cleary, Proc. of SPIE vol. 5744, pp. 870-878.*

Yonghong Xie, Qiang Ji, "A New Efficient Ellipse Detection Method", 2. pp. 957. doi: 10.1109/ICPR 2002.

Yu Qiao, S.H. Ong, "Connectivity-based multiple-circle fitting", Pattern Recognition 37 (2004) 755-765.

Kyoung-Ryul Julian Chun et al., "The 'single big cryoballoon' technique for acute pulmonary vein isolation in patients with paroxysmal atrial fibrillation: a prospective observational single centre study", European Heart Journal 30:699-709, 2009.

\* cited by examiner

310

Outline edges: (a) lines that form circle corresponding to balloon; and (b) lines that cut through circle and correspond to handle
Outliers: all other lines

LOCALIZATION AND TRACKING OF CRYO-BALLOON DURING INTERVENTIONAL FLUOROSCOPY IMAGING

CROSS-REFERENCE TO RELATED APPLICATION

This application claims priority under 35 U.S.C. §119 to U.S. provisional application No. 61/514,199 filed Aug. 2, 2011, the disclosure of which is incorporated by reference herein in its entirety.

BACKGROUND OF THE INVENTION

1. Technical Field

The present invention relates to interventional fluoroscopy.

2. Discussion of the Related Art

Cryothermal energy ablation via balloon catheter is a promising procedure for treating paroxysmal atrial fibrillation by means of pulmonary vein isolation (PVI). However, to improve the ablation success and minimize procedure time, it is critical to assess the balloon position as well as assess how much contact and pressure exist between the balloon and anatomy.

SUMMARY OF THE INVENTION

In an exemplary embodiment of the present invention, there is provided a method for the detection of a balloon catheter within a fluoroscopic image, including: removing noise from a fluoroscopic image; detecting edges of a balloon catheter in the fluoroscopic image, wherein the detected edges include subsets of connected edges; extracting an edge subset from the subsets of connected edges; fitting a model to the extracted edge subset; removing outliers of the extracted edge subset based on the fitting of the model; adding the extracted edge subset without the outlier to a data set; repeating the extracting, fitting, removing and adding steps for the remainder of the subsets of connected edges; and fitting the model to the data set, wherein the data set is indicative of the balloon catheter.

The edges are detected by using a canny edge detector.

The balloon of the balloon catheter is spherical.

The model is an elliptical model.

The model is fit to the extracted edge subsets and the data set by a least-squares method.

The balloon is deformable and the method further includes estimating pressure applied to the balloon based on the deformation of the balloon.

The extracted edge subset includes a circular arc.

In an exemplary embodiment of the present invention, there is provided a system for the detection of a balloon catheter within a fluoroscopic image, including: a memory device for storing a program; a processor in communication with the memory device, the processor operative with the program to: remove noise from a fluoroscopic image; detect edges of a balloon catheter in the fluoroscopic image, wherein the detected edges include subsets of connected edges; extract an edge subset from the subsets of connected edges; fit a model to the extracted edge subset; remove outliers of the extracted edge subset based on the fitting of the model; add the extracted edge subset without the outlier to a data set; repeat the extracting, fitting, removing and adding steps for the remainder of the subsets of connected edges; and fit the model to the data set, wherein the data set is indicative of the balloon catheter.

The edges are detected by using a canny edge detector.

The balloon of the balloon catheter is spherical.

The model is an elliptical model.

The model is fit to the extracted edge subsets and the data set by a least-squares method.

The balloon is deformable and the system is further operative with the program to estimate pressure applied to the balloon based on the deformation of the balloon.

The extracted edge subset includes a circular arc.

In an exemplary embodiment of the present invention, there is provided a computer program product for the detection of a balloon catheter within a fluoroscopic image, including: a non-transitory computer readable storage medium having computer readable program code embodied therewith, the computer readable program code comprising: computer readable program code configured to perform the steps of: removing noise from a fluoroscopic image; detecting edges of a balloon catheter in the fluoroscopic image, wherein the detected edges include subsets of connected edges; extracting an edge subset from the subsets of connected edges; fitting a model to the extracted edge subset; removing outliers of the extracted edge subset based on the fitting of the model; adding the extracted edge subset without the outlier to a data set; repeating the extracting, fitting, removing and adding steps for the remainder of the subsets of connected edges; and fitting the model to the data set, wherein the data set is indicative of the balloon catheter.

The edges are detected by using a canny edge detector.

The balloon of the balloon catheter is spherical.

The model is an elliptical model.

The model is fit to the extracted edge subsets and the data set by a least-squares method.

The balloon is deformable and the computer readable program code is further configured to perform the step of estimating pressure applied to the balloon based on the deformation of the balloon.

The extracted edge subset includes a circular arc.

DETAILED DESCRIPTION OF EXEMPLARY EMBODIMENTS

Disclosed herein is a method to detect structures of interest in a fluoroscopic image, according to an exemplary embodiment of the present invention. The structures of interest may include a balloon and catheter handle used for cryothermal energy ablation to manage paroxysmal atrial fibrillation. The ability to highlight and detect balloon catheters allows not only for better highlighting for a physician, since balloon catheters are faint in fluoroscopic images, but also (with three-dimensional (3D) reconstruction via bi-plane fluoro)

allows for the incorporation of existing 3D data of a patient to allow for more precise catheter placement.

The method disclosed herein focuses on spherical balloon catheters. However, more deformable pear-shaped balloon catheters are applicable to the present invention. In fact, the use of deformable balloon catheters potentially enable pressure estimation, as will be discussed later.

Figure 1:
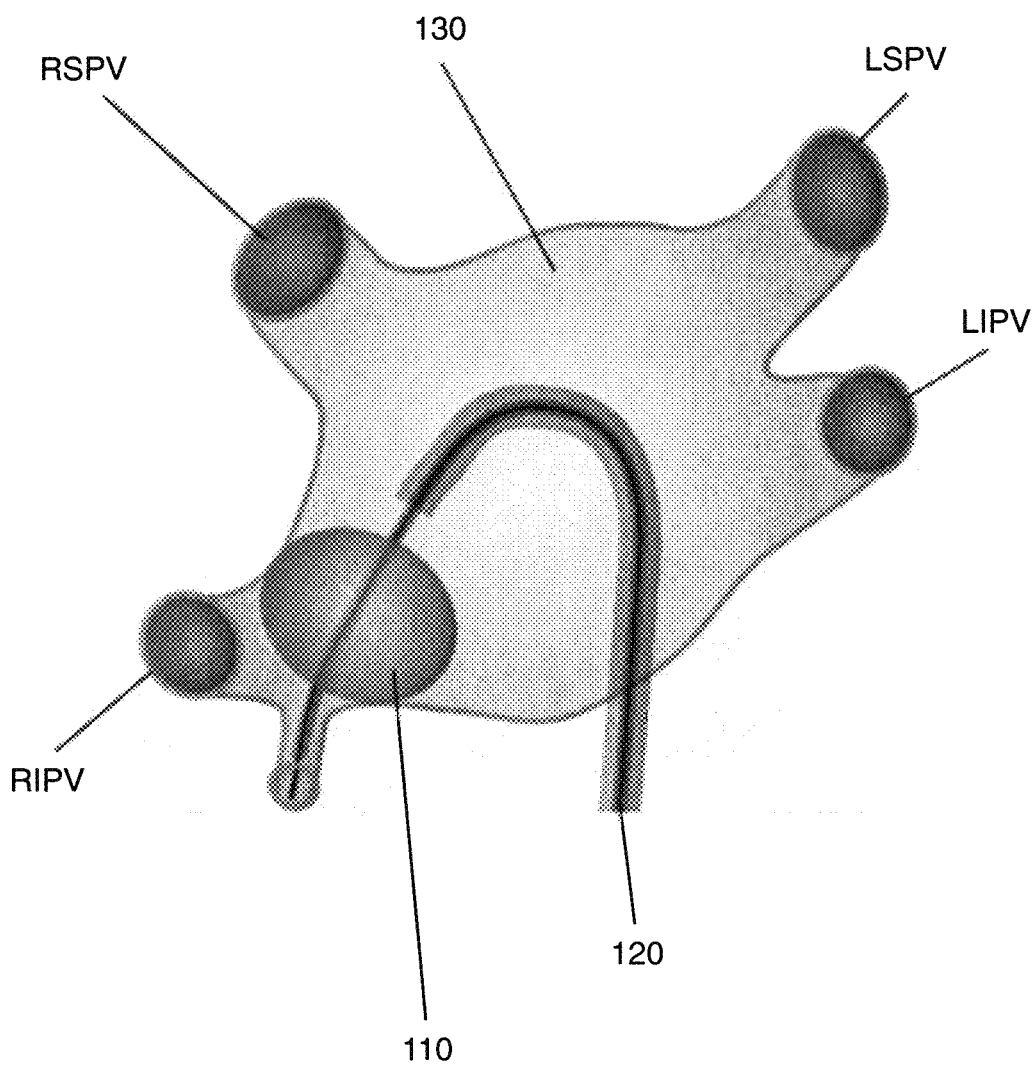
FIG. 1 is a diagram showing pulmonary veins and a spherical balloon catheter in use inside the heart.

FIG. 1 illustrates a spherical balloon catheter (balloon 110 and catheter handle 120) in use inside a heart 130. FIG. 1 further shows the right superior pulmonary vein RSPV, the left superior pulmonary vein LSPV, the left inferior pulmonary vein LIPV and the right inferior pulmonary vein RIPV of the heart 130.

Figure 2:
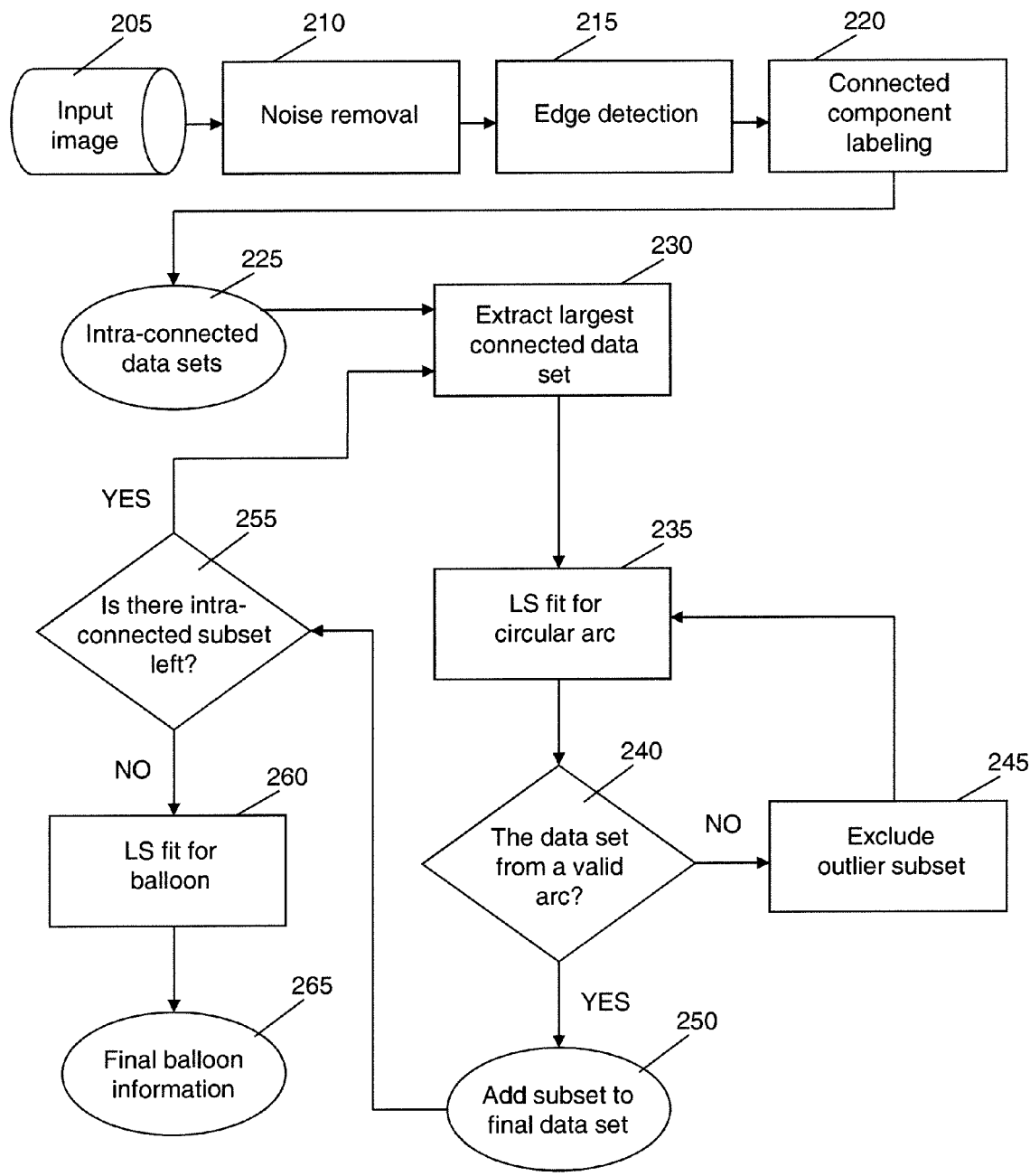
FIG. 2 is a flowchart describing balloon information extraction according to an exemplary embodiment of the present invention.

FIG. 2 illustrates a method to detect structures of interest in a fluoroscopic image, according to an exemplary embodiment of the present invention. The following discussion will focus on the detection of a single structure, e.g., a balloon of a balloon catheter; however, additional structures may be detected by this method, e.g., a catheter handle of the balloon catheter.

Figure 3:
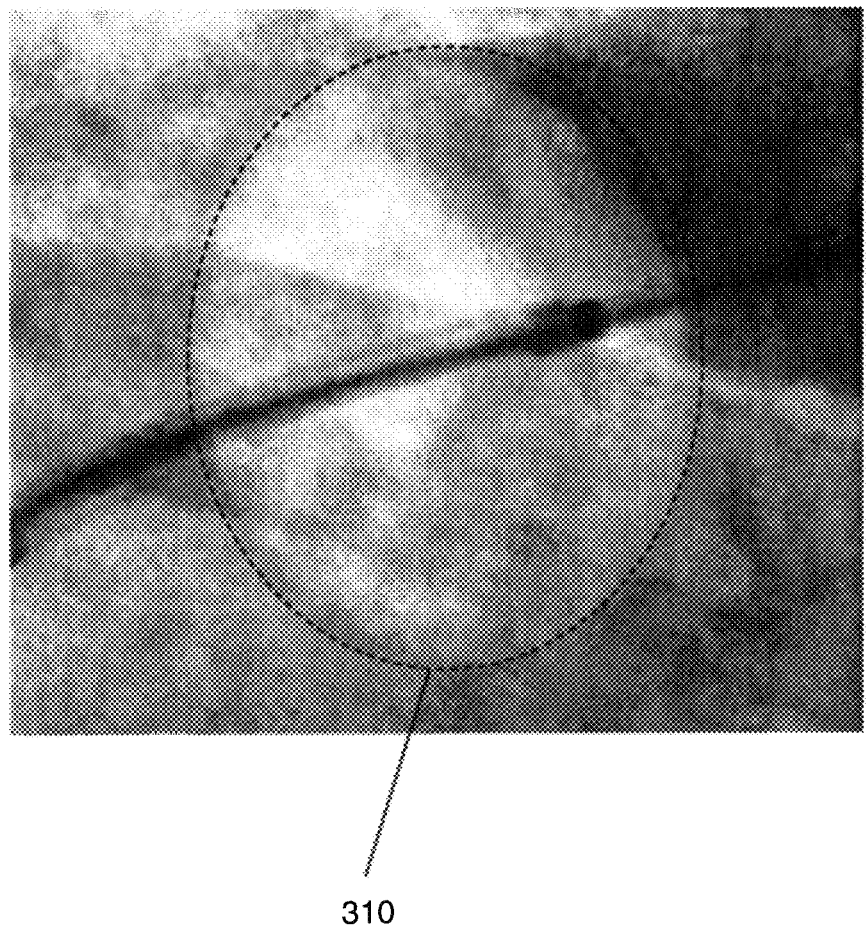
FIG. 3 is a diagram showing a fluoroscopy zoomed to show an area near a balloon center.

In FIG. 2, an input image is received (205). The input image may be a fluoroscopic image. FIG. 3 shows a fluoroscopic image zoomed in to show an area 310 presumed to be the balloon of the balloon catheter. The image is processed to remove noise (210). For example, a two-dimensional (2D) median filtering or wavelet approach may be used to remove noise. Edges of the balloon are detected (215). In this regard, a binary image is calculated by using an edge detection method, e.g., the Canny edge detector. A connected component labeling is performed (220). As a result, the edges are discomposed in subsets of connected edges (or, intra-connected data sets) (225). An example of this is in FIG. 4 where outline edges (i.e., lines forming the circle shape) of the balloon are shown.

Figure 4:
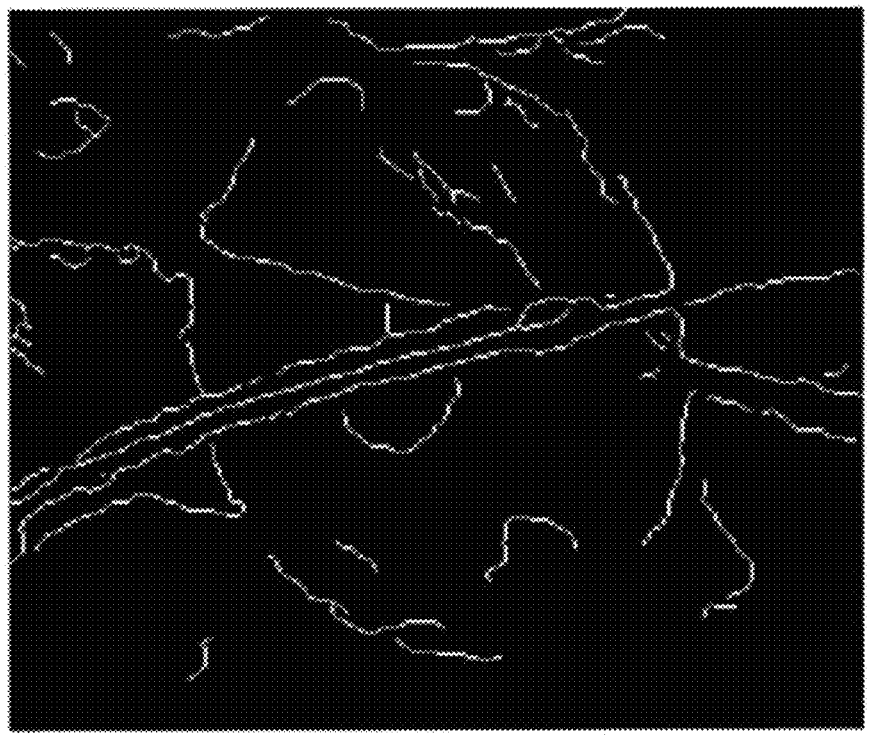
FIG. 4 is a diagram showing an intermediate result of the method in FIG. 2.

A largest connected data set is extracted (230). A model is fitted to this connected data set (235). The model may be a circular model and may be fitted by the least-squares method. Using the model-fitted connected data set, a determination is made as to which data corresponds to an edge of the balloon and which data does not (240). The data that does not correspond to an edge of the balloon may be considered as outliers. Outliers are shown in FIG. 4 as lines that do not constitute part of the circle. Outliers do not conform to the model by a threshold. The outliers are removed (245). The data that corresponds to an edge of the balloon is added to a final data set (250).

Figure 5:
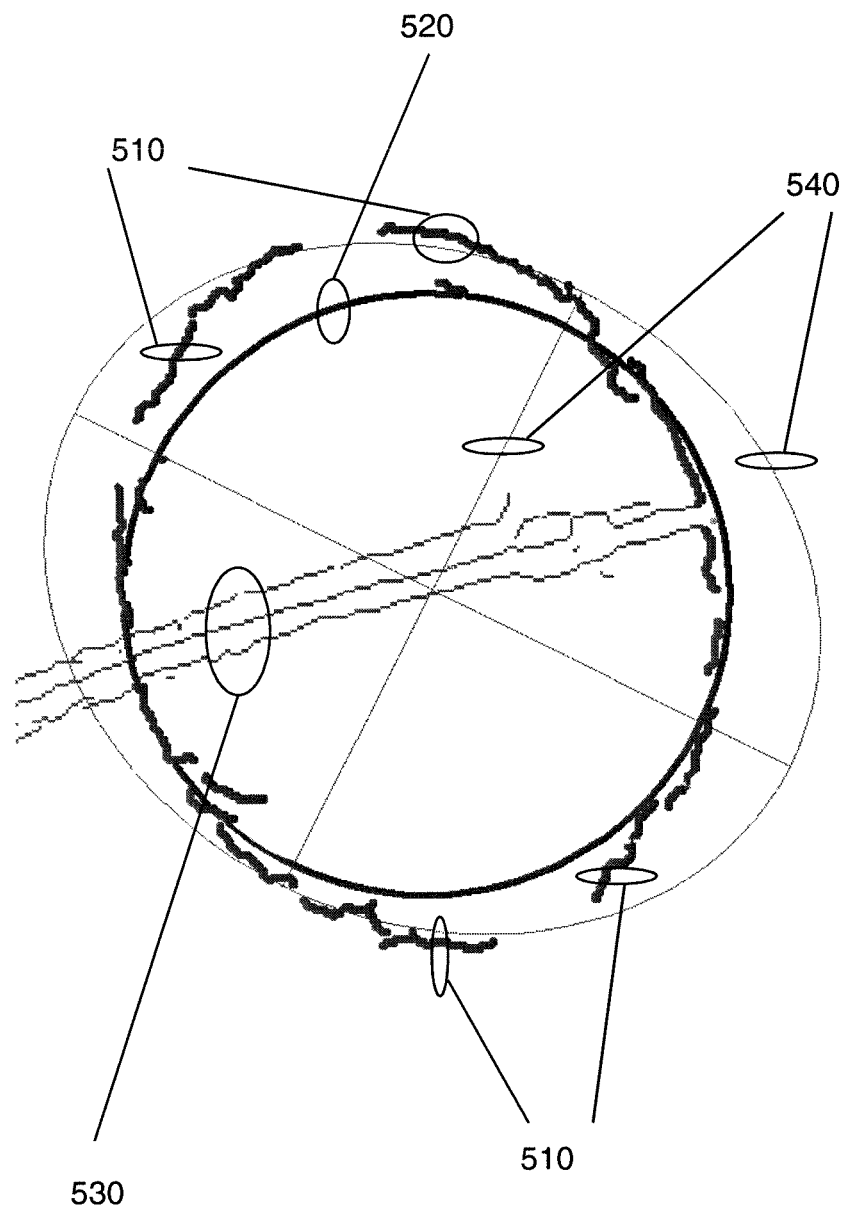
FIG. 5 is a diagram showing a final result of the method in FIG. 2.

If there are intra-connected subsets left (255), steps 230-250 are repeated for the next largest connected data set. If no intra-connected subsets are left (255), the circular model is fit to the final data set (260). In this case, the least-squares method may be used for model fitting. An estimation of the balloon is given (265). An example of the final result of this method is shown in FIG. 5. FIG. 5 shows the balloon subset 510 and the fitted circle 520. The subset 510 shows the final edges determined while the circle 520 represents the final fitted circle. FIG. 5 also shows the catheter handle 530 and estimated pressure 540. These features will be discussed later.

As can be seen, the method to detect structures of interest in a fluoroscopic image, according to an exemplary embodiment of the present invention, consists of three main steps. (A) The image is processed to remove noise and a binary image is calculated by using an edge detection method such as the Canny edge detector. Edges are discomposed in subsets of connected edges. (B) Outliers are removed by taking every subset and applying a model-fitting (e.g., for the balloon, knowledge of its radius may be the model). (C) A model-fitting is done with all the subsets that are not considered as outliers. This gives the final estimation.

Alternatively to the method of FIG. 2, a Hough transform using an elliptical model can be used to both locate and determine the degree of distortion of the balloon catheter. Such a method involves accumulating "votes" for particular parameter combinations in a parameter space. The same elimination steps can then be used to remove false positives. A transform for an ellipse would involve a four-dimensional (4D) parameter space. However, very efficient implementations are possible. Given the size of the balloon catheter, two of these parameters would be severely constrained, leading to further efficiency and possible real-time performance. General transforms for arbitrary shapes would be suitable for detecting pear-shaped catheters with similar constraints and optimizations possible.

The method of FIG. 2 can be extended to include the following cases.

(I) The balloon can be tracked in time by using a temporal filtering (e.g., Kalman filtering). The model for the temporal filtering could also use input from an electrocardiogram (ECG) to account for breathing and cardiac motion correction. The benefits of temporal filtering is that it will help reduce processing time by processing only a region of interest given by the temporal filtering model and it will increase accuracy of the estimation.

(II) The model-fitting for the balloon can account for deformation rather than expecting a perfect circle, ellipse or particular pear shape. These deformations may reflect the pressure that is applied between the balloon and the anatomy. By integrating the pressure with respect to time, it is possible to estimate the force applied to the anatomy that was ablated. 540 represents an elliptical model applied to a balloon catheter capable of deformation. Given the changes in the minor and major radii of the fitted ellipse and knowing the mechanical properties of the balloon catheter, one can estimate the force placed on the balloon by the degree of deformation. Hence, a higher degree of deformation represents greater force.

(III) Features within the balloon catheter can be used to dramatically increase accuracy. As shown in FIG. 5 (530), the central linear structure of the catheter can also be used as a feature to improve detection accuracy. Such linear structures can be detected by edge filters or can be detected with a Hough transform for lines. The linear structure within the detected balloon is a "signature" for the balloon catheter and its presence can be used to either limit the search area for the balloon or to verify that a balloon was correctly detected.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
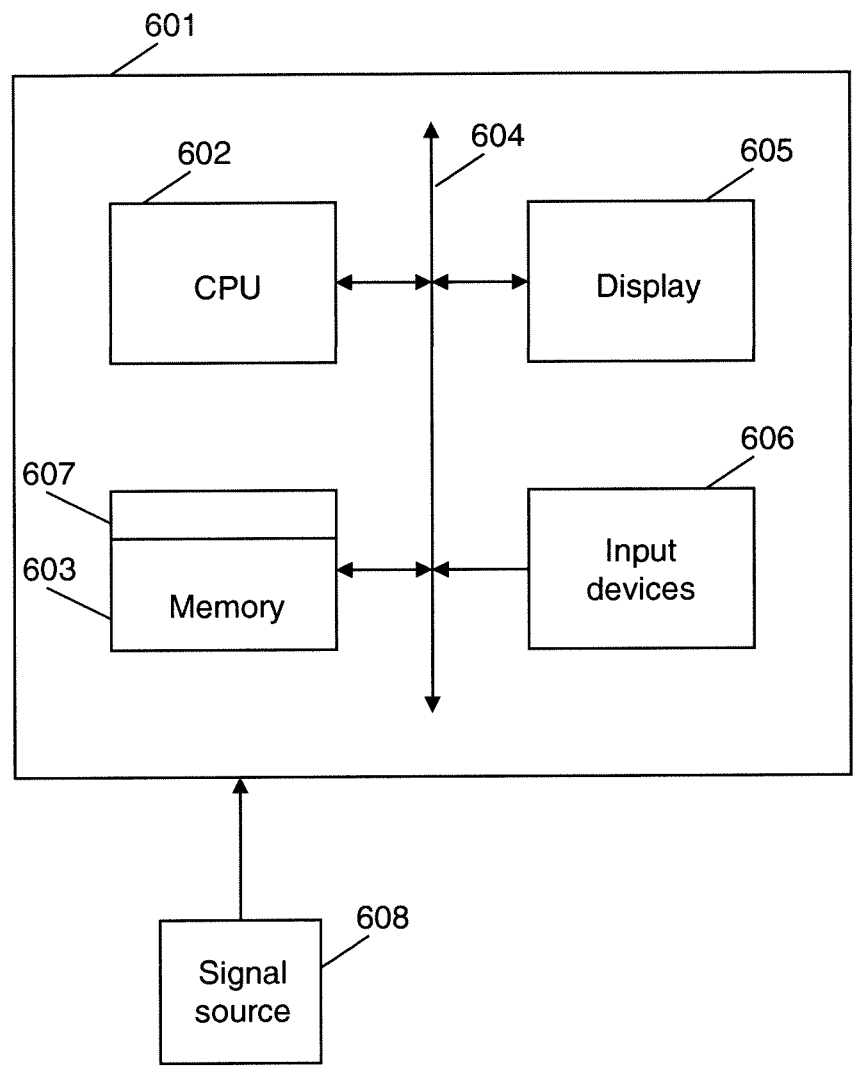
FIG. 6 illustrates a computer system in which an exemplary embodiment of the present invention may be implemented.

Referring now to FIG. 6, according to an exemplary embodiment of the present invention, a computer system 601 can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include RAM, ROM, disk drive, tape drive, etc., or a combination thereof. Exemplary embodiments of present invention may be implemented as a routine 607 stored in memory 603 (e.g., a non-transitory computer-readable storage medium) and executed by the CPU 602 to process the signal from a signal source 608. As such, the computer system 601 is a general-purpose computer system that becomes a specific purpose computer system when executing the routine 607 of the present invention.

The computer system 601 also includes an operating system and micro-instruction code. The various processes and functions described herein may either be part of the micro-instruction code or part of the application program (or a combination thereof) which is executed via the operating system. In addition, various other peripheral devices may be connected to the computer system 601 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method for the detection of a balloon catheter within a fluoroscopic image, comprising:
    removing noise from a fluoroscopic image;
    detecting edges of a balloon catheter in the fluoroscopic image, wherein the detected edges include subsets of connected edges;
    extracting an edge subset from the subsets of connected edges;
    fitting a model to the extracted edge subset;
    removing outliers of the extracted edge subset based on the fitting of the model;
    adding the extracted edge subset without the outlier to a data set;
    repeating the extracting, fitting, removing and adding steps for the remainder of the subsets of connected edges; and
    fitting the model to the data set, wherein a central linear structure is present and detectable within the image of the balloon catheter, and the central linear structure is used to limit a search area of the balloon catheter or verify that the balloon catheter was correctly detected,
    wherein the method further comprises estimating pressure applied to the balloon based on a state of the balloon after its deformation and known properties of a three-dimensional model of the balloon.

2. The method of claim 1, wherein the edges are detected by using a canny edge detector.

3. The method of claim 1, wherein the balloon of the balloon catheter is spherical.

4. The method of claim 1, wherein the model is an elliptical model.

5. The method of claim 1, wherein the model is fit to the extracted edge subsets and the data set by a least-squares method.

6. The method of claim 1, wherein the extracted edge subset includes a circular arc.

7. A system for the detection of a balloon catheter within a fluoroscopic image, comprising:
    a memory device for storing a program;
    a processor in communication with the memory device, the processor operative with the program to:
    remove noise from a fluoroscopic image;
    detect edges of a balloon catheter in the fluoroscopic image, wherein the detected edges include subsets of connected edges;
    extract an edge subset from the subsets of connected edges;
    fit a model to the extracted edge subset;
    remove outliers of the extracted edge subset based on the fitting of the model;
    add the extracted edge subset without the outlier to a data set;
    repeat the extracting, fitting, removing and adding steps for the remainder of the subsets of connected edges; and
    fit the model to the data set, wherein a central linear structure is present and detectable within the image of the balloon catheter, and the central linear structure is used to limit a search area of the balloon catheter or verify that the balloon catheter was correctly detected,
    wherein the system is further operative with the program to estimate pressure applied to the balloon based on a state of the balloon after its deformation and known properties of a three-dimensional model of the balloon.

8. The system of claim 7, wherein the edges are detected by using a canny edge detector.

9. The system of claim 7, wherein the balloon of the balloon catheter is spherical.

10. The system of claim 7, wherein the model is an elliptical model.

11. The system of claim 7, wherein the model is fit to the extracted edge subsets and the data set by a least-squares method.

12. The system of claim 7, wherein the extracted edge subset includes a circular arc.

13. A computer program product for the detection of a balloon catheter within a fluoroscopic image, comprising:
    a non-transitory computer readable storage medium having computer readable program code embodied therewith, the computer readable program code comprising:
    computer readable program code configured to perform the steps of:
    removing noise from a fluoroscopic image;
    detecting edges of a balloon catheter in the fluoroscopic image, wherein the detected edges include subsets of connected edges;
    extracting an edge subset from the subsets of connected edges;
    fitting a model to the extracted edge subset;
    removing outliers of the extracted edge subset based on the fitting of the model;
    adding the extracted edge subset without the outlier to a data set;
    repeating the extracting, fitting, removing and adding steps for the remainder of the subsets of connected edges; and
    fitting the model to the data set, wherein a central linear structure is present and detectable within the image of the balloon catheter, and the central linear structure is used to limit a search area of the balloon catheter or verify that the balloon catheter was correctly detected,
    wherein the computer readable program code is further configured to perform the step of estimating pressure applied to the balloon based on a state of the balloon after its deformation and known properties of a three-dimensional model of the balloon.

14. The computer program product of claim 13, wherein the edges are detected by using a canny edge detector.

15. The computer program product of claim 13, wherein the balloon of the balloon catheter is spherical.

16. The computer program product of claim 13, wherein the model is an elliptical model.

17. The computer program product of claim 13, wherein the model is fit to the extracted edge subsets and the data set by a least-squares method.

18. The computer program product of claim 13, wherein the extracted edge subset includes a circular arc.

* * * * *